(12) United States Patent
Chen et al.

(10) Patent No.: US 8,055,829 B2
(45) Date of Patent: Nov. 8, 2011

(54) ADAPTABLE HARDWARE-PROGRAMMABLE TRANSMISSION INTERFACE FOR INDUSTRIAL PCS

(75) Inventors: Tinway Chen, Taipei (TW); Ashley Wang, Taipei (TW); Chen Tung Sun, Taipei (TW); Sherman Tang, Taipei (TW)

(73) Assignee: T-Win Systems, Inc., Taoyuan Hisen (TW)

( * ) Notice: Subject to any disclaimer, the term of this patent is extended or adjusted under 35 U.S.C. 154(b) by 70 days.

(21) Appl. No.: 12/146,103

(22) Filed: Jun. 25, 2008

(65) Prior Publication Data
US 2010/0199011 A1 Aug. 5, 2010

(51) Int. Cl.
G06F 13/00 (2006.01)
(52) U.S. Cl. ........................................ 710/301; 710/104
(58) Field of Classification Search .................. 710/104, 710/300, 301, 316
See application file for complete search history.

(56) References Cited

U.S. PATENT DOCUMENTS

| | | | |
|---|---|---|---|
| 7,600,112 B2* | 10/2009 | Khatri et al. | 713/100 |
| 2006/0109636 A1* | 5/2006 | Hood et al. | 361/792 |
| 2006/0184704 A1* | 8/2006 | Yu | 710/300 |
| 2006/0252285 A1* | 11/2006 | Shen | 439/43 |
| 2007/0067541 A1* | 3/2007 | Chang | 710/307 |
| 2007/0101037 A1* | 5/2007 | Lin et al. | 710/301 |

* cited by examiner

*Primary Examiner* — Glenn A Auve
(74) *Attorney, Agent, or Firm* — Jackson IPG PLLC; Demian K. Jackson

(57) ABSTRACT

An adaptable hardware-programmable transmission interface for an industrial PC is characterized by a module switch provided on a motherboard of the industrial PC, and a plurality of riser cards, each of which is connectable to a connecting end of the motherboard and formed with one or a plurality of slots having a variety of specifications, allowing the motherboard to be significantly downsized. In addition, the same motherboard can be connected with a selected one of the different riser cards to provide lane interfaces that meet various dynamic changing needs.

3 Claims, 5 Drawing Sheets

US 8,055,829 B2

ADAPTABLE HARDWARE-PROGRAMMABLE TRANSMISSION INTERFACE FOR INDUSTRIAL PCS

BACKGROUND OF THE INVENTION

1. Technical Field

The present invention relates to an adaptable hardware-programmable transmission interface for an industrial PC, wherein a module switch can match with a riser card formed with slots having a variety of specifications to provide lane interfaces that meet various dynamic changing needs.

2. Description of Related Art

Generally, an industrial PC has a motherboard formed with a plurality of memory controller hub (MCH) slots and expansion slots to suit different purposes and needs. Hence, a 3G I/O bus interface device, such as a PCI-Express, has emerged that not only allows a higher transfer speed and occupies a smaller circuit board (motherboard) area, but also has better anti-noise capabilities. Therefore, the 3G I/O bus interface device has been widely used in industrial PCs, servers and other IT equipment.

3G I/O bus interface devices are usually divided according to their transfer speeds into different interfaces, each provided with a different number of lanes, such as x1, x4, x8 and x16. Different slots are developed for the respective different interfaces and correspond to different 3G I/O bus interface cards.

Therefore, the motherboard of an industrial PC is generally designed with a plurality of hardcore systems having fixed numbers of lanes, namely x1, x4, x8 and x16. However, the industrial PC has a limited circuit board (motherboard) area, so that the number of slots on a 3G I/O bus interface is seriously restricted, which also reflects the impracticality of conventional design concepts in this respect.

In order to satisfy users' various needs in the number and combination of slots on a 3G I/O bus interface, a plurality of versions must be developed for the motherboard of an industrial PC, which is neither practical nor economical.

Furthermore, a module switch, such as a Max I/O, was developed by leading computer companies to facilitate switching for the 3G I/O bus interface. Such module switches are now very popular in IT products, especially in industrial PC products.

BRIEF SUMMARY OF THE INVENTION

In order to solve the problem of conventional motherboards in coping with different expansion needs, the present invention provides an adaptable hardware-programmable transmission interface for an industrial PC, comprising a module switch provided on a motherboard of the industrial PC, and a plurality of riser cards, each of which is connectable to an electrically conducting end on an edge of the motherboard and formed with one or a plurality of first slots having different specifications, wherein the module switch switches according to the riser card connected to the motherboard and thereby controls a memory controller hub, so as to provide lane interfaces that meet various dynamic changing needs.

BRIEF DESCRIPTION OF THE SEVERAL VIEWS OF THE DRAWINGS

The invention as well as a preferred mode of use, further objectives and advantages thereof will best be understood by reference to the following detailed description of illustrative embodiments when read in conjunction with the accompanying drawings, wherein.

DETAILED DESCRIPTION OF THE INVENTION

The present invention provides an adaptable hardware-programmable transmission interface for an industrial PC, wherein the transmission interface is characterized by a module switch, such as a Max I/O, provided on a motherboard of the industrial PC, and a plurality of riser cards, each of which is connectable to an electrically conducting end, such as a gold finger connector or rapid connector, of the motherboard and formed with one or a plurality of first slots having a variety of specifications, allowing the motherboard to be significantly downsized. In addition, a combination of the same motherboard with the different riser cards provides lane interfaces that can satisfy various dynamic changing needs.

The module switch employed in the present invention has a corresponding 3G I/O bus as PCI-Express controller that contains several lanes, wherein different switching circuits, so that voltages (VCC) can be set or a grounding (GND) connection is made to perform programming.

The module switch, such as the Max I/O, provided on the motherboard of the present invention allows selective switching to adapt to the different riser cards having slots of a variety of specifications, so that the 3G I/O bus as PCI-E controller can output via the lanes set by the user. Thus, the riser cards can be changed according to different lanes and different slots as needed.

Figure 1:
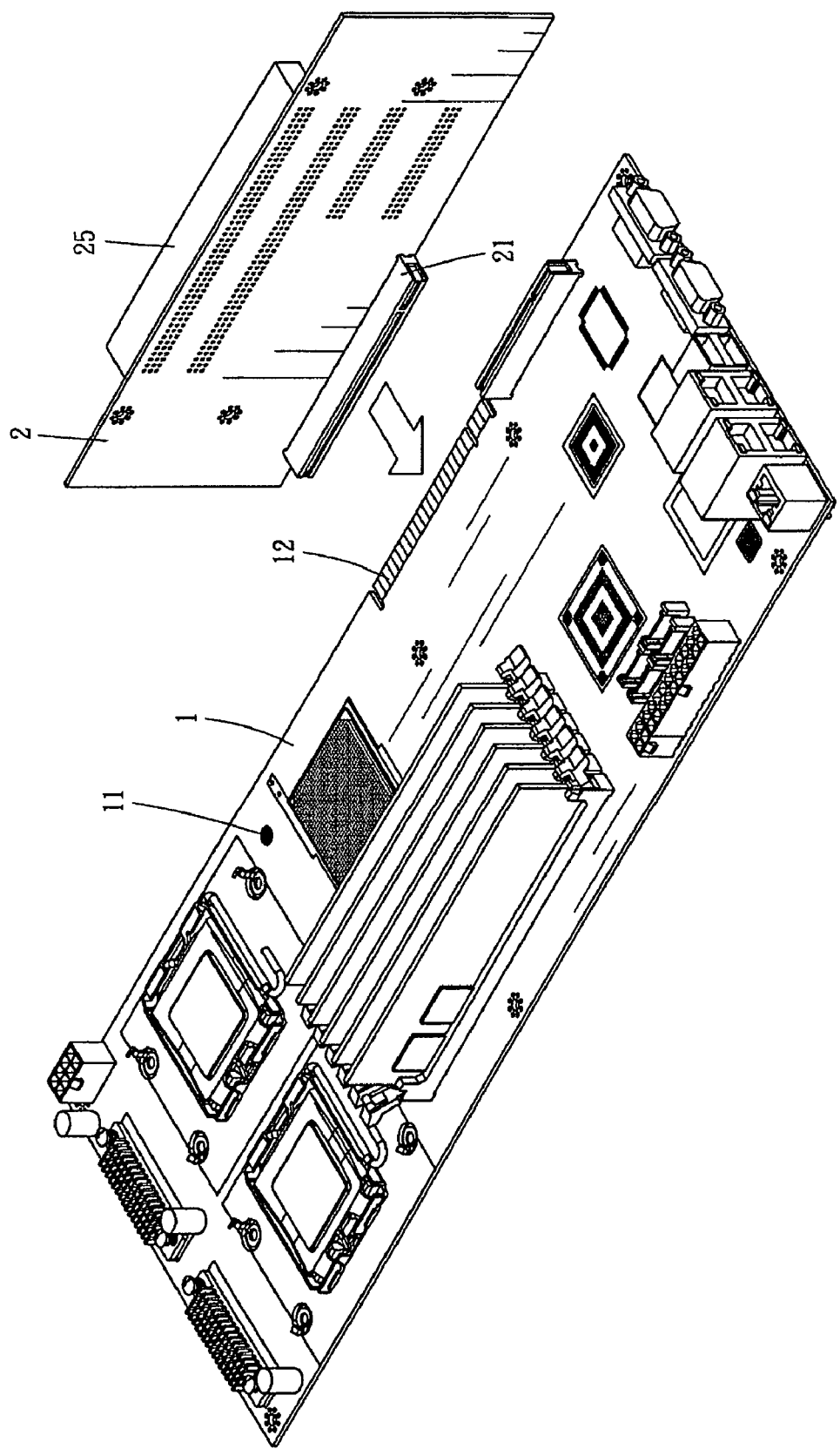
FIG. 1 is an exploded perspective view of a riser card and a motherboard according to the present invention.
Figure 2:
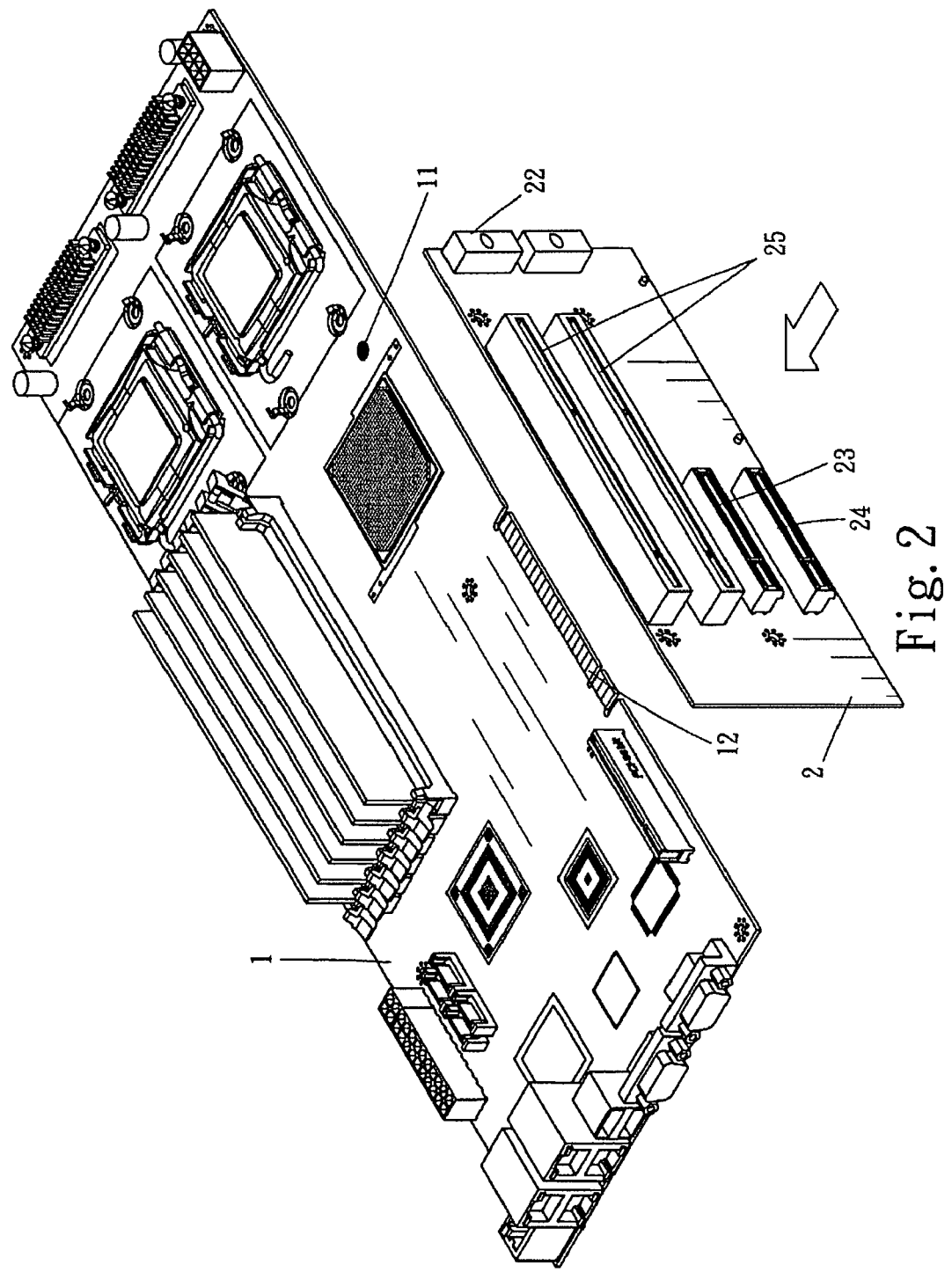
FIG. 2 is an exploded perspective view of the riser card and motherboard according to the present invention from another angle.
Figure 3:
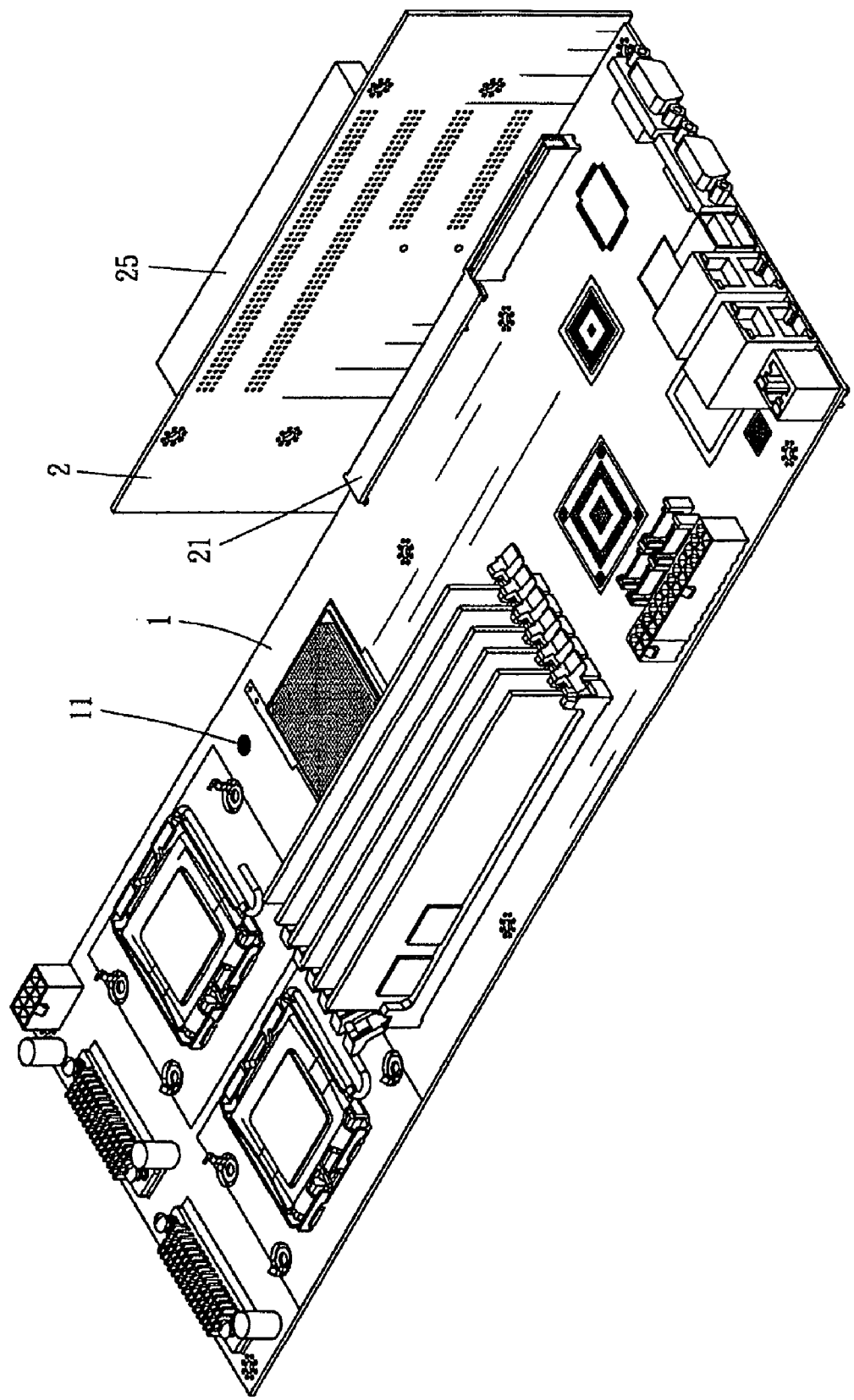
FIG. 3 is a perspective view of the riser card connected to the motherboard of the present invention.
Figure 4:
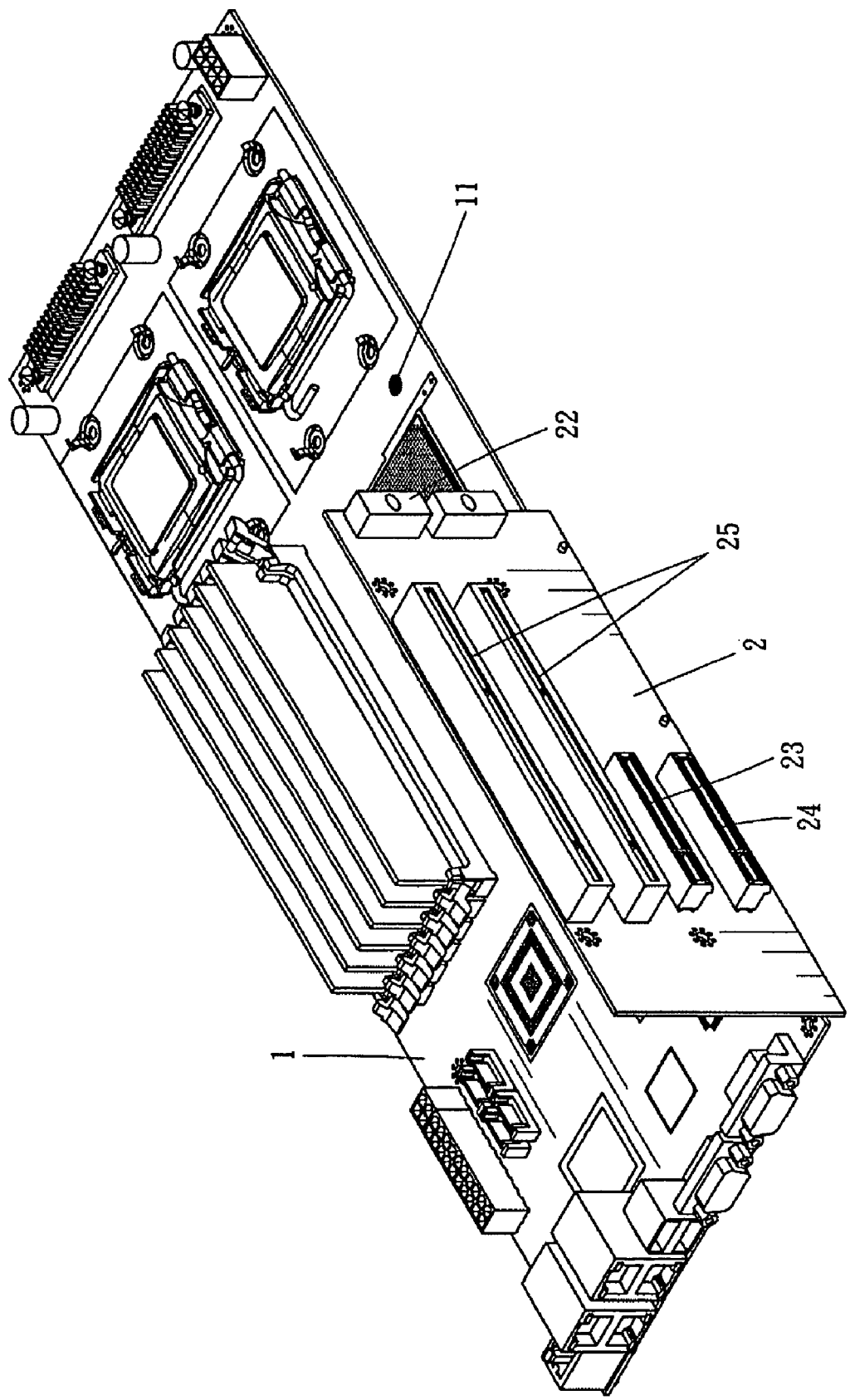
FIG. 4 is a perspective of the riser card connected to the motherboard of the present invention from another angle.

Referring to FIGS. 1 to 4, an adaptable hardware-programmable transmission interface for an industrial PC essentially includes a module switch 11, such as the Max I/O, mounted on a motherboard 1 of the industrial PC, and various riser cards 2, each of which is connectable to an electrically conducting end 12, such as a gold finger connector, on an edge of the motherboard 1 and formed with one or a plurality of first slots having different specifications.

The module switch 11, such as the Max I/O, allows connection with the various riser cards 2 formed with the first slots having the different specifications, and switches according to the following table.

| PE WIDTH [0, 1, 2, 3] | Port 2 | Port 3 | Port 4 | Port 5 | Port 6 | Port 7 |
|---|---|---|---|---|---|---|
| 0000 (Default) | x4 | x4 | x4 | x4 | x4 | x4 |

-continued

| PE WIDTH [0, 1, 2, 3] | Port 2 | Port 3 | Port 4 | Port 5 | Port 6 | Port 7 |
|---|---|---|---|---|---|---|
| 0001 | x4 | x4 | x4 | x4 | | |
| 0010 | x4 | x4 | x8 | | x4 | x4 |
| 0011 | x4 | x4 | x8 | | x8 | |
| 0100 | | x4 | | x16 | | |
| Others | | | ---Reserved--- | | | |
| 1000 | | x8 | x4 | x4 | x4 | x4 |
| 1001 | | x8 | x4 | x4 | | |
| 1010 | | x8 | x8 | | x4 | x4 |
| 1011 | | x8 | x8 | | x8 | |
| 1100 | | x8 | | x16 | | x16 |

Each of the riser cards 2 has a second slot 21 connectable to the electrically conducting end 12 on the edge of the motherboard 1, and a power input end 22.

Figure 5:
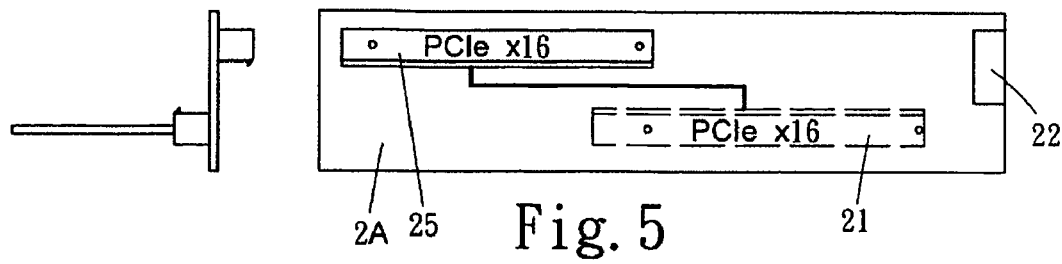
FIG. 5 is a schematic drawing of a first embodiment of the riser card according to the present invention.
Figure 6:
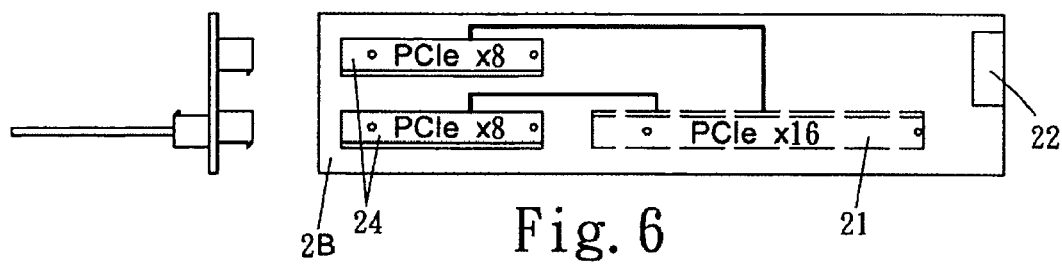
FIG. 6 is a schematic drawing of a second embodiment of the riser card according to the present invention.
Figure 7:
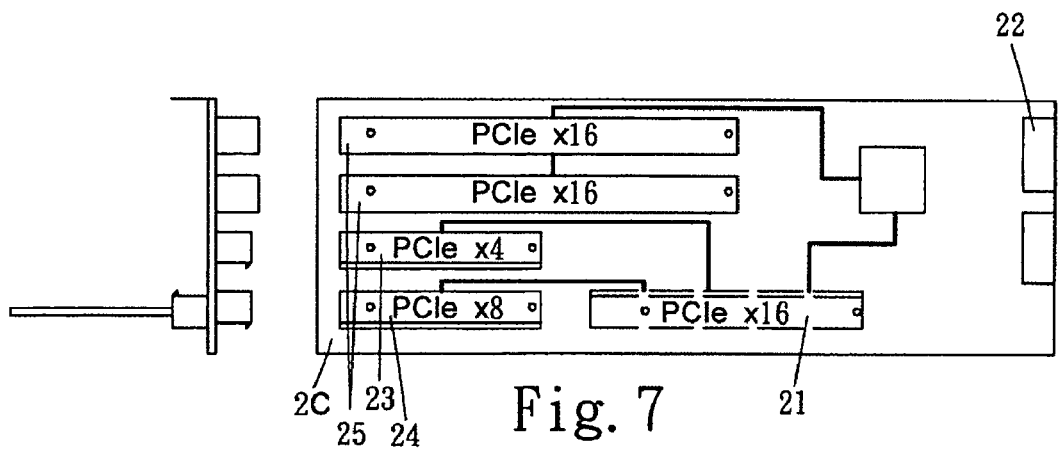
FIG. 7 is a schematic drawing of a third embodiment of the riser card according to the present invention.
Figure 8:
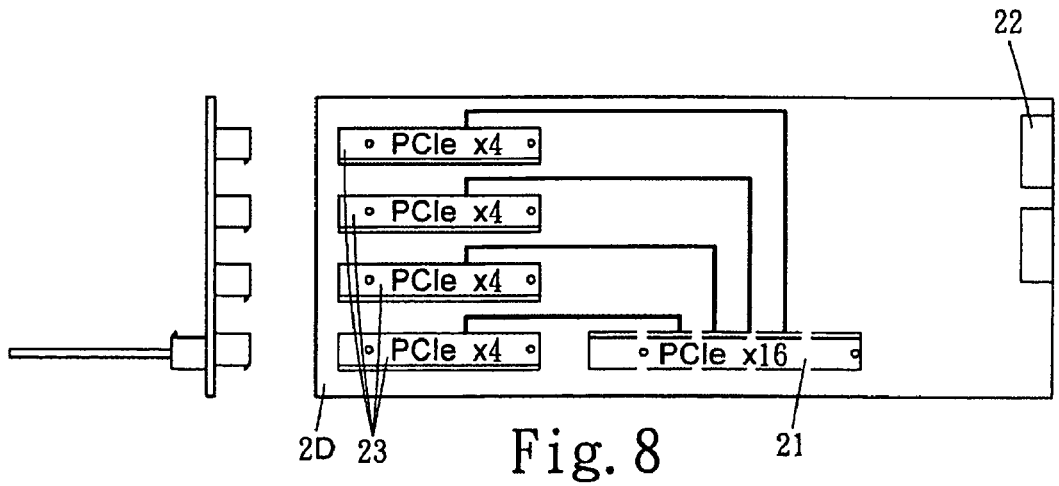
FIG. 8 is a schematic drawing of a fourth embodiment of the riser card according to the present invention.

Referring to FIGS. 5 to 8, the riser cards 2 of the present invention include riser cards 2A, 2B, 2C and 2D, each formed with one or a combination of slots 23, 24 and 25, wherein each of the slots 23, 24 and 25 has a different specification, namely x4, x8 or x16, and allows connection with a network card, a sound card, a graphics card, as well as other expansion cards.

Each of the riser cards 2A, 2B, 2C and 2D can be selected and then connected via the second slot 21 to the electrically conducting end 12 on the edge of the motherboard 1, so that the module switch 11, such as the Max I/O, switches to an appropriate position and thereby controls the 3G I/O bus as PCI-Express controller to enable the interface lanes needed by the user.

Thus, the motherboard 1 can be matched with a selected one of the riser cards 2A, 2B, 2C and 2D to provide lane interfaces that satisfy various dynamic changing needs. Meanwhile, an area of the motherboard 1 can be significantly reduced.

The present invention has been described with preferred embodiments thereof and it is understood that the embodiments are not intended to limit the scope of the present invention. Moreover, as the content disclosed herein should be readily understood and can be implemented by a person skilled in the art, all equivalent changes or modifications which do not depart from the spirit of the present invention are encompassed by the appended claims.

The invention claimed is:

1. An adaptable hardware-programmable transmission interface for an industrial PC, comprising:
   a motherboard of the industrial PC;
   a module switch provided on the motherboard of the industrial PC; and
   a plurality of riser cards, each of which is connectable to an electrically conducting end on an edge of the motherboard and formed with one or a plurality of slots wherein each riser card has different specifications than the other riser cards;
   wherein the module switch switches according to the riser card, when the riser card is connected to the motherboard, and thereby controls a 3G I/O bus as PCI-Express controller, so as to provide a lane interface corresponding to the riser card and position of the module switch.

2. The adaptable hardware-programmable transmission interface as claimed in claim 1, wherein each of the riser cards is provided with a power input end.

3. The adaptable hardware-programmable transmission interface as claimed in claim 1, wherein the slots have specifications comprising one of x4, x8 and x16.

* * * * *